US006323612B1

(12) United States Patent
Miyagoe

(10) Patent No.: US 6,323,612 B1
(45) Date of Patent: Nov. 27, 2001

(54) MOTOR DRIVING DEVICE

(75) Inventor: Yasuhiro Miyagoe, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/522,018

(22) Filed: Mar. 9, 2000

(30) Foreign Application Priority Data

Mar. 10, 1999 (JP) .................................................. 11-062956

(51) Int. Cl.[7] .................................................... H02P 7/00
(52) U.S. Cl. .......................................... 318/432; 318/434
(58) Field of Search .................................... 388/806, 807, 388/815, 821; 318/560, 561, 434, 432, 433

(56) References Cited

U.S. PATENT DOCUMENTS 4,639,798 * 1/1987 Harrison et al. .
5,847,523 * 12/1998 Rappenecker et al. .
6,130,989 * 10/2000 Mizumoto et al. .
6,166,507 * 12/2000 Uegami .

* cited by examiner

Primary Examiner—Jeffrey Donels
(74) Attorney, Agent, or Firm—Arent Fox Kintner Plotkin & Kahn, PLLC

(57) ABSTRACT

A motor driving device for keeping the rotation speed of a spindle motor has a detector for detecting the rotation rate of the motor and a circuit for producing an error voltage that represents the error of the detected rotation rate from the specified rotation rate. In accordance with the error voltage, the amplitude of the driving signal of the motor is controlled. As the error voltage becomes lower, the amplitude of the driving signal is increased to supply more current to the motor. To prevent an overcurrent through the motor, a current limiter circuit is provided. When the error voltage is lower than the current limit voltage output from the current limiter circuit, the driving signal is controlled in accordance with the current limit voltage instead of the error voltage. The current limiter circuit is so configured that the current limit voltage does not vary with temperature.

4 Claims, 3 Drawing Sheets

MOTOR DRIVING DEVICE

BACKGROUND OF THE INVENTION

1. Field of the Invention

The present invention relates to a motor driving device for driving a motor.

2. Description of the Prior Art

A motor driving device is incorporated, for example, in a disk recording/reproducing apparatus for recording data on and reproducing data from a disk-shaped recording medium. In such a motor driving device, to keep the rotation speed of a motor constant, the rotation rate of the motor is detected, and the amplitude of a motor driving signal is controlled in accordance with the difference signal (error signal) that represents the difference between the detected rotation rate and the specified rotation rate. Here, when an extremely large error occurs, there is a risk of an overcurrent flowing through the motor. To prevent this, a current limiter circuit is provided to restrict the current flowing through the motor within a certain limit. FIG. 4 shows the current limiter circuit employed in a conventional motor driving device. As shown in this figure, in this current limiter circuit, the output of a constant-current circuit CC is connected to the input of a current mirror circuit CM composed of an input-side NPN-type transistor Q1 and an output-side NPN-type transistor Q2.

The emitter of the transistor Q1 and the emitter of the transistor Q2 are connected through resistors R2 and R3, respectively, to a reference voltage GND. The collector of the output-side transistor Q2 of the current mirror circuit CM is connected through a resistor R1 to a supplied voltage $V_{CC}$, with which a spindle motor is driven. The voltage at the node between the resistor R1 and the collector of the transistor Q2 is fed out as a current limit voltage $V_{CL}$.

The error signal (error voltage) mentioned above is, together with the current limit voltage $V_{CL}$ output from the current limiter circuit, fed to a selector. The selector outputs the error voltage when the error voltage is higher than the current limit voltage and outputs the current limit voltage when the error voltage is lower than the current limit voltage. The output of this selector is fed through a current feedback amplifier to an amplitude control circuit for controlling the amplitude of the motor driving signal;.

However, configured as shown in FIG. 4, this current limiter circuit employed in a conventional spindle motor driving device as mentioned above has the following disadvantage. Suppose that the output current of the constant current circuit CC is I, the resistance of the resistor R1 is R, and the resistors R2 and R3 have equal resistances. Then, the current limit voltage $V_{CL}$ is given by $$V_{CL}=V_{CC}-I\cdot R$$

Here, since the resistance varies with temperature, the current limit voltage VCL is prone to be influenced by heat. That is, it is difficult to keep the value of $I\cdot R$ ($=V_{CC}-V_{CL}$) within±several percent of 200 [mV] irrespective of temperature.

Accordingly, the limit of the driving current of the spindle motor is prone to vary with heat, and thus there is a risk of a current higher than the intended limit flowing through the spindle motor, causing thermal runaway. This often affects adversely the other circuits constituting the motor driving device, making the motor driving device unreliable against heat.

SUMMARY OF THE INVENTION

An object of the present invention is to provide a motor driving device that offers higher reliability against heat.

To achieve the above object, according to the present invention, a motor driving device having a current limiter circuit that produces a current limit voltage, which is a fixed voltage determined in accordance with the driving voltage of the motor, usually controls the driving current of the motor in accordance with the signal representing the error of the actual rotation rate of the motor from the specified rotation rate thereof, but, when this requires that the driving current of the motor be higher than a predetermined level, controls the driving current of the motor in accordance with the current limit voltage. In this way, this motor driving device can restrict the driving current of the motor. Here, the current limiter circuit is composed of a plurality of resistors for dividing a given voltage, a first transistor that receives at its base a voltage obtained by voltage division achieved by the resistors, a constant current circuit for keeping the emitter current of the first transistor constant, a second transistor having its base connected to the emitter of the first transistor, a resistor connected between the emitter of the second transistor and one of the higher- and lower-potential sides of the driving voltage of the motor, and a resistor connected between the collector of the second transistor and the other of the higher- and lower-potential sides of the driving voltage of the motor. This current limiter circuit outputs as the current limit voltage the collector voltage of the second transistor. According to this circuit configuration, the current limit voltage is little affected by heat, and this helps suppress variation of the limit of the driving current of the motor with heat.

BRIEF DESCRIPTION OF THE DRAWINGS

This and other objects and features of the present invention will become clear from the following description, taken in conjunction with the preferred embodiments reference to the accompanying drawings in which.

Figure 3:
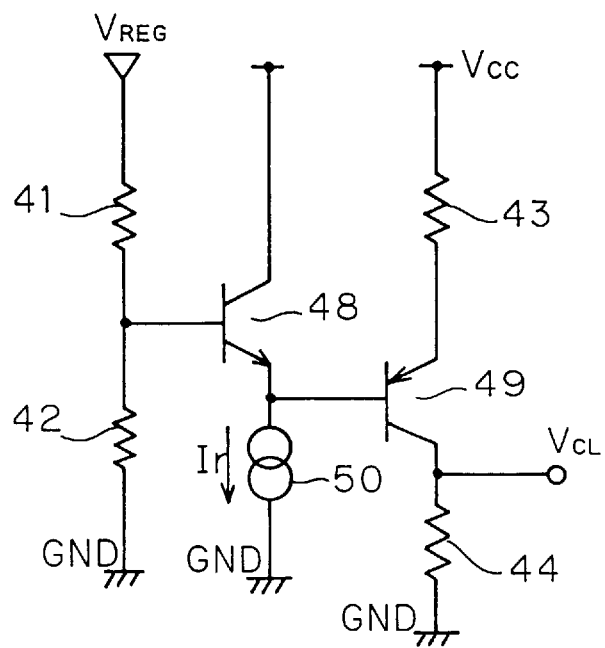
Figure 4:
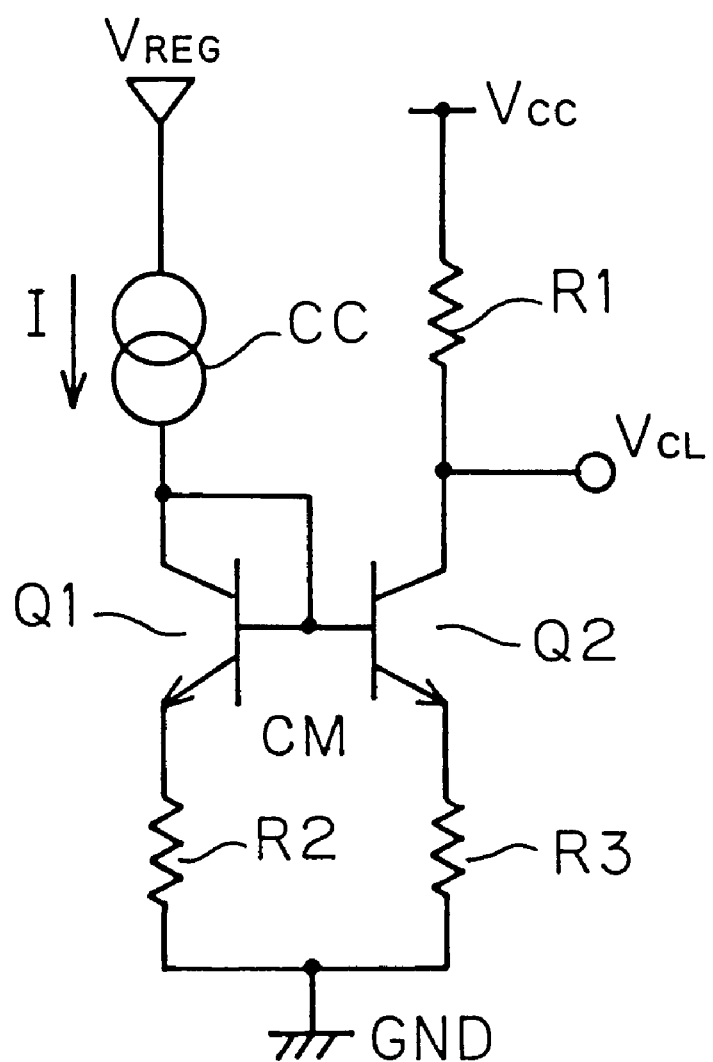

FIG. is a diagram showing an example of the circuit configuration of the current limiter circuit employed in a spindle motor driving device embodying the invention;

FIG. 3 is a diagram showing another example of the circuit configuration of the current limiter circuit employed in a spindle motor driving device embodying the invention; and FIG. 4 diagram showing the circuit configuration of the current limiter circuit employed in a conventional spindle driving device.

DESCRIPTION OF THE PREFERRED EMBODIMENTS

Figure 1:
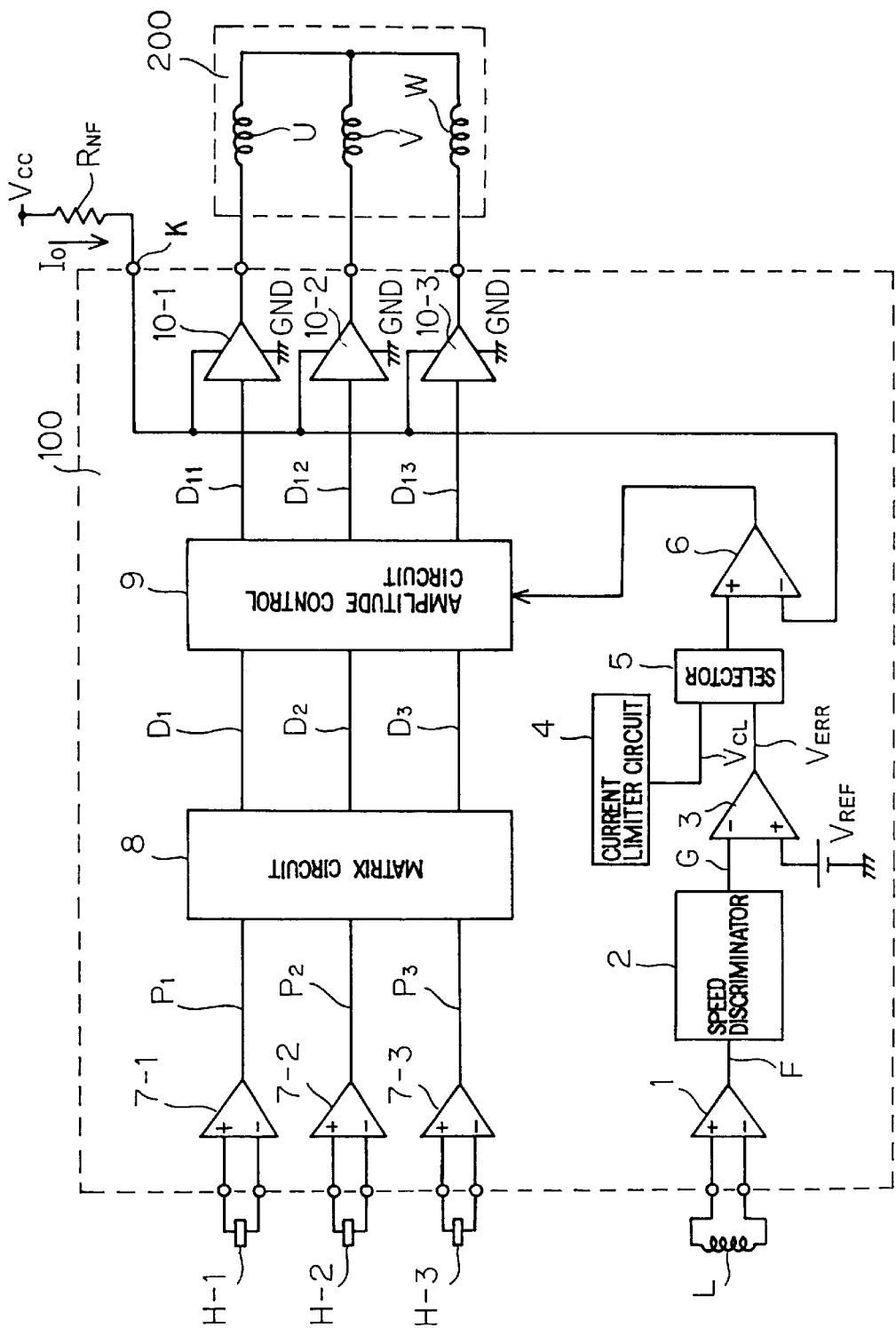
FIG. 1 is a block diagram of a spindle motor driving device.

Hereinafter, embodiments of the present invention will be described with reference to the accompanying drawings. FIG. 1 is a block diagram of a spindle motor driving device 100 as is incorporated in a disc recording/reproducing apparatus for recording data on and reproducing data from a disk-shaped medium in order to drive a spindle motor for rotating the disk. As shown in this figure, the spindle motor driving device 100 is composed of an FG comparator 1, a speed discriminator 2, an error amplifier 3, a current limiter circuit 4, a selector 5, a current feedback amplifier 6, hole amplifiers 7-1, 7-2, and 7-3, a matrix circuit 8, an amplitude control circuit 9, and drivers 10-1, 10-2, and 10-3.

The sine-wave signal generated by a rotation rate detection coil L formed as a conductive pattern around the spindle motor is converted into a square-wave signal (hereinafter referred to as the "FG signal") F by the FG comparator 1, and is then fed to the speed discriminator 2.

Since the FG signal F has a frequency that corresponds to the rotation rate of the spindle motor, the speed discriminator 2, on the basis of this FG signal F, detects the rotation rate of the spindle motor, and then generates and outputs a rotation rate error signal G whose voltage varies according to the error of the detected rotation rate of the spindle motor from the specified rotation rate thereof.

The error amplifier 3 is composed of an operational amplifier, and receives, at its non-inverting input terminal (+), a constant voltage $V_{REF}$ and, at its inverting input terminal (−), the rotation rate error signal G output from the speed discriminator 2. The voltage of the error signal $V_{ERR}$ output from the error amplifier 3 becomes higher as the detected rotation rate of the spindle motor becomes higher relative to the specified rotation rate thereof, and becomes lower as the detected rotation rate becomes lower relative to the specified rotation rate.

The current limiter circuit 4 produces and outputs a current limit voltage $V_{CL}$ that is lower by a predetermined voltage than the driving voltage $V_{CC}$ of the spindle motor.

The current feedback amplifier 6 is composed of an operational amplifier. The non-inverting input terminal (+) of the current feedback amplifier 6 is connected to the output of the selector 5, and the inverting input terminal (−) thereof is connected to one end of a current detection resistor $R_{NF}$ so as to receive a voltage lower than the driving source voltage $V_{CC}$ of the spindle motor (i.e. the voltage of the supplied direct-current voltage) by the voltage drop caused by the driving current $I_0$ of the spindle motor flowing through the current detection resistor $R_{NF}$. The output of the current feedback amplifier 6 is fed to the amplitude control circuit 9.

To the inputs of the hole amplifiers 7-1, 7-2, and 7-3, hole devices H-1, H-2, and H-3 are connected individually that are fitted around the rotor of the spindle motor. Thus, the output signals $P_1$, $P_2$, and $P_3$ of the individual hole amplifiers 7-1, 7-2, and 7-3 together indicate the rotational position of the spindle motor.

The output signals $P_1$, $P_2$, and $P_3$, of the hole amplifiers 7-1, 7-2, and 7-3 are subjected to predetermined integration processing performed by the matrix circuit 8 so as to be converted individually into driving signals $D_1$, $D_2$, and $D_3$ having phases shifted forward through 30°, and are then fed to the amplitude control circuit 9.

The amplitude control circuit 9 receives the driving signals $D_1$, $D_2$, and $D_3$ output from the matrix circuit 8 and the output voltage of the current feedback amplifier 6. The amplitude control circuit 9 controls the amplitudes of the driving signals $D_1$, $D_2$, and $D_3$ in accordance with the output of the current feedback amplifier 6 in such a way that, the higher the output voltage of the current feedback amplifier 6, the smaller the amplitudes of the driving signals $D_1$, $D_2$, and $D_3$ and, the lower the output voltage of the current feedback amplifier 6, the larger the amplitudes of the driving signals $D_1$, $D_2$, and $D_3$.

The drivers 10-1, 10-2, and 10-3 amplify the driving signals $D_{11}$, $D_{12}$, and $D_{13}$ output from the amplitude control circuit 9 to increase their driving capacity, and then feed them to the spindle motor 200. As a result, currents flow through the coils U, V, and W constituting the spindle motor 200 that are connected in a star-like configuration, and in this way the spindle motor 200 is driven.

The output stage of each of the drivers 10-1, 10-2, and 10-3 is realized, in general, by connecting a PNP-type power transistor and an NPN-type power transistor in series between the driving source voltage $V_{CC}$ for the spindle motor and the reference voltage GND so as to form a push-pull type output circuit, and here the PNP-type transistor, which is connected on the higher-voltage side, is connected also through the current detection resistor $R_{NF}$ to the driving source voltage $V_{CC}$ for the spindle motor. Since the driving current $I_0$ of the spindle motor flows through this current detection resistor $R_{NF}$, a voltage corresponding to the driving current $I_0$ of the spindle motor is applied to the inverting input terminal of the current feedback amplifier 6.

The circuit configuration described above permits the currents flowing through the coils U, V, and W constituting the spindle motor to be switched with appropriate timing in accordance with the rotational position of the spindle motor, and thereby permits the spindle motor to rotate with the maximum efficiency. Moreover, the rotation rate of the spindle motor is controlled as described below so as to be kept at the specified rotation rate.

Suppose that the driving current of the spindle motor is $I_0$, the error voltage $V_{ERR}$ is $V_{ERR}$, and the resistance of the resistor $R_{NF}$ is $R_{NF}$. Then, the amplifier 6 operates so that $$I_0 = (V_{CC} - V_{ERR})/R_{NF}$$

In addition, as described previously, the error voltage $V_{ERR}$ output from the error amplifier 3 becomes higher as the detected rotation rate of the spindle motor becomes higher relative to the specified rotation rate thereof, and becomes lower as the detected rotation rate becomes lower relative to the specified rotation rate thereof.

Accordingly, as the detected rotation rate of the spindle motor becomes higher than the specified rotation rate thereof, the driving current of the spindle motor is reduced, and, as the detected rotation rate becomes lower than the specified rotation rate, the driving current of the spindle motor is increased. In this way, the rotation rate of the spindle motor is controlled so as to be kept at the specified rotation rate.

When the error voltage $V_{ERR}$ is lower than the current limit voltage $V_{CL}$, the selector 5 outputs the current limit voltage $V_{CL}$. That is, when the error voltage $V_{ERR}$ is extremely low, the amplitudes of the driving signals $D_{11}$, $D_{12}$, and $D_{13}$ are made very large, and thus large currents flow through the motor. This makes the voltage drop across the resistor $R_{NF}$ larger, and thus makes the voltage at the point K lower. If this voltage becomes lower than the limit voltage $V_{CL}$, an overcurrent flows through the motor. Therefore, to prevent this, in such a case, the selector 5 outputs the limit voltage $V_{CL}$ instead of the error voltage $V_{ERR}$. As a result, the amplitudes of the driving signals $D_{11}$, $D_{12}$, and $D_{13}$ are reduced, and accordingly less current is fed to the motor. In this way, burning of the motor due to an overcurrent is prevented.

Figure 2:
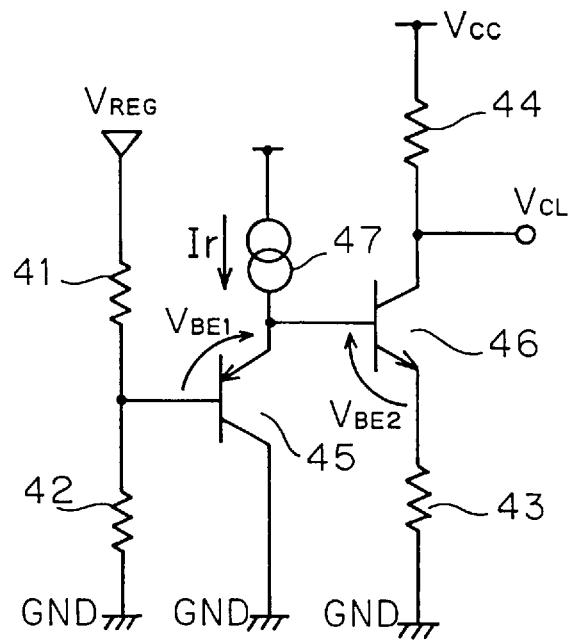

In the spindle motor driving device of this embodiment, the current limiter circuit 4 is configured as shown in FIG. 2. As shown in this figure, the current limiter circuit 4 is composed of resistors 41, 42, 43, and 44, a PNP-type transistor 45, an NPN-type transistor 46, and a constant current circuit 47.

The resistors 41 and 42 are connected in series between a constant voltage $V_{REG}$ and the reference voltage GND. The PNP-type transistor 45 has its base connected to the node between the resistors 41 and 42, has its emitter connected to the output of the constant current circuit 47 that outputs a constant current $I_r$, and has its collector connected to the reference voltage GND.

The NPN-type transistor 46 has its base connected to the emitter of the PNP-type transistor 45, has its emitter connected through the resistor 43 to the reference voltage GND, and has its collector connected through the resistor 44 to the driving voltage $V_{CC}$ of the spindle motor. The collector voltage of the NPN-type transistor 46 is fed out as the current limit voltage $V_{CL}$.

According to this circuit configuration, the collector current ($\approx$ the emitter current) that is to be passed through the NPN-type transistor 46 is determined by the resistances of the resistors 43 and 44 and by how far the current limit voltage $V_{CL}$ is set to be lower than the driving voltage $V_{CC}$ of the spindle motor. Thus, considering that the base-emitter voltage of a transistor depends on the emitter current thereof, by appropriately setting the constant current $I_r$ output from the constant current circuit 47 in accordance with the resistances of the resistors 43 and 44, and also setting the resistances of the resistors 41 and 42, it is possible to make equal the base-emitter voltage $V_{BE1}$ of the PNP-type transistor 45 and the base-emitter voltage $V_{BE2}$ of the NPN-type transistor 46 and in addition obtain a desired current limit voltage $V_{CL}$.

Now, suppose that the resistances of the resistors 41, 42, 43, and 44 are $R_1$, $R_2$, $R_3$, and $R_4$, respectively, and the base-emitter voltage $V_{BE1}$ of the PNP-type transistor 45 and the base-emitter voltage $V_{BE2}$ of the NPN-type transistor 46 are equal. Then, the current limit voltage $V_{CL}$ is given as i $V_{CL} = V_{CC} - R_2 \cdot R_4 \cdot V_{REG} / \{(R_1 = R_2)R_3\}$ Thus, variation of the resistances due to temperature variation is canceled out.

Accordingly, in the spindle motor driving device of this embodiment, the current limit voltage $V_{CL}$ is little affected by heat, and this helps suppress variation of the limit of the driving current of the motor with heat, improving the reliability of the driving device against heat.

In the embodiment described above, the current detection resistor $R_{NF}$ is connected to the driving voltage $V_{CC}$ of the spindle motor. However, the current detection resistor $R_{NF}$ may be connected to the reference voltage GND instead, and in that case the current limiter circuit 4 is, as shown in FIG. 3, so configured as to have an NPN-type transistor 48 in place of the PNP-type transistor 45, a PNP-type transistor 49 in place of the NPN-type transistor 46, a constant current circuit 50 of a type into which a current flows in place of the constant current circuit 47. This current limiter circuit 4 also produces a current limit voltage $V_{CL}$ that is little affected by heat.

Moreover, although the above embodiment deals with a case where the driving signals are produced on the basis of the outputs from hole devices, it is also possible to adopt a so-called sensorless configuration employing no hole devices in which the driving signals are produced on the basis of the output voltages detected by the use of logic circuits, or any other configuration in which the driving signals are produced otherwise than described herein.

Moreover, although the above embodiment deals with a case where a spindle motor is driven, the present invention is applicable also to motor driving devices for driving motors of any type other than spindle motors as long as they have a circuit for producing a current limit voltage for limiting the driving current of their respective motors.

What is claimed is:

1. A motor driving device having a current limiter circuit that produces a current limit voltage different by a predetermined voltage from a driving voltage of a motor, the motor driving device performing a first operation whereby a driving current of the motor is controlled in accordance with a signal corresponding to an error of an actual rotation rate of the motor from a specified rotation rate thereof, the motor driving device performing, when the first operation requires that the driving current of the motor be higher than a predetermined level, a second operation whereby the driving current of the motor is controlled in accordance with the current limit voltage, wherein the current limiter circuit comprises a plurality of resistors for dividing a given voltage, a first transistor that receives at a base thereof a voltage obtained by voltage division achieved by the resistors, a constant current circuit for keeping an emitter current of the first transistor constant, a second transistor having a base thereof connected to an emitter of the first transistor, a resistor connected between an emitter of the second transistor and one of the higher- and lower-potential sides of the driving voltage of the motor, and a resistor connected between a collector of the second transistor and the other of the higher- and lower-potential sides of the driving voltage of the motor, the current limiter circuit outputting as the current limit voltage a collector voltage of the second transistor.

2. A motor driving device comprising:

a direct-current voltage source;

a driver connected through a first resistor to the direct-current voltage source so as to receive therefrom a current that is to be supplied to a motor;

an amplitude control circuit that feeds the driver with a motor driving signal and that controls an amplitude of the motor driving signal;

an error voltage producing circuit that produces an error voltage corresponding to an error of an actual rotation rate of the motor from a specified rotation rate thereof;

a current limiter circuit that produces a current limit voltage for restricting the current that is supplied to the motor;

a selector that outputs the error voltage when the error voltage is higher than the current limit voltage and that outputs the current limit voltage when the error voltage is lower than the current limit voltage; and a circuit that controls the amplitude control circuit in such a way that the amplitude of the motor driving signal is reduced when the selector outputs a voltage higher than a predetermined voltage and that the amplitude of the motor driving signal is increased when the selector outputs a voltage lower than the predetermined voltage, wherein the current limiter circuit comprises a plurality of resistors for dividing a given voltage, a first transistor that receives at a base thereof a voltage obtained by voltage division achieved by the resistors, a constant current circuit for keeping an emitter current of the first transistor constant, a second transistor having a base thereof connected to an emitter of the first transistor, a resistor connected between an emitter of the second transistor and one of the higher- and lower-potential sides of the driving voltage of the motor, and a resistor connected between a collector of the second transistor and the other of the higher- and lower-potential sides of the driving voltage of the motor, the current limiter circuit outputting as the current limit voltage a collector voltage of the second transistor.

3. A motor driving device as claimed in claim 2, wherein the first transistor is a PNP-type transistor and the second transistor is an NPN-type transistor.

4. A motor driving device as claimed in claim 2, wherein the first transistor is an NPN-type transistor and the second transistor is a PNP-type transistor.

* * * * *